United States Patent
Bauer et al.

(10) Patent No.: US 9,835,080 B2
(45) Date of Patent: Dec. 5, 2017

(54) FRESH AIR SUPPLY DEVICE

(71) Applicant: Mahle International GmbH, Stuttgart (DE)

(72) Inventors: Swen-Juri Bauer, Stuttgart (DE); Andreas Gruener, Hattenhofen (DE); Uwe Grass, Stuttgart (DE)

(73) Assignee: Mahle International GmbH (DE)

( * ) Notice: Subject to any disclaimer, the term of this patent is extended or adjusted under 35 U.S.C. 154(b) by 299 days.

(21) Appl. No.: 14/417,130

(22) PCT Filed: Jul. 22, 2013

(86) PCT No.: PCT/EP2013/065425
§ 371 (c)(1),
(2) Date: Jan. 23, 2015

(87) PCT Pub. No.: WO2014/016253
PCT Pub. Date: Jan. 30, 2014

(65) Prior Publication Data
US 2015/0204234 A1 Jul. 23, 2015

(30) Foreign Application Priority Data
Jul. 26, 2012 (DE) .................. 10 2012 213 164

(51) Int. Cl.
*F02B 29/04* (2006.01)
*F02B 33/44* (2006.01)
(Continued)

(52) U.S. Cl.
CPC ...... *F02B 29/0475* (2013.01); *F02B 29/0443* (2013.01); *F02B 29/0462* (2013.01);
(Continued)

(58) Field of Classification Search
CPC .................. F02B 29/0443; F02B 29/0462
(Continued)

(56) References Cited

U.S. PATENT DOCUMENTS 3,382,855 A * 5/1968 Glamann ............... F02B 33/44
123/559.1
3,881,455 A * 5/1975 Belsanti .............. F02B 29/0462
123/563
(Continued)

FOREIGN PATENT DOCUMENTS

DE 1428176 U 2/1938
DE 2738293 A1 3/1979
(Continued)

OTHER PUBLICATIONS

German Patent DE3505492 English Machine Translation by Espacenet, dated Jan. 12, 2017.*
(Continued)

*Primary Examiner* — Mark Laurenzi
*Assistant Examiner* — Deming Wan
(74) *Attorney, Agent, or Firm* — Fishman Stewart PLLC (57) ABSTRACT

A fresh air supply device for an internal combustion engine may include a filter element arranged in a filter compartment. A charge-air cooler may be arranged in a cooler compartment. A one-piece housing may integrally include the filter compartment and the cooler compartment. The charge-air cooler may have a coolant inlet, a coolant outlet and an internal coolant path which connects the coolant inlet to the coolant outlet. The internal coolant path may be coupled in a heat-transferring manner to a charge-air path extending inside the housing and through the cooler compartment.

19 Claims, 10 Drawing Sheets

(51) Int. Cl.
*F28F 9/02* (2006.01)
*F02M 35/04* (2006.01)
*F02M 35/10* (2006.01)
*F02M 35/024* (2006.01)

(52) U.S. Cl.
CPC ........ *F02M 35/024* (2013.01); *F02M 35/042* (2013.01); *F02M 35/10157* (2013.01); *F02M 35/02483* (2013.01); *F02M 35/10255* (2013.01); *F02M 35/10386* (2013.01); *Y02T 10/146* (2013.01)

(58) Field of Classification Search
USPC .................. 123/563, 559.1; 60/599; 165/173
See application file for complete search history.

(56) References Cited

U.S. PATENT DOCUMENTS

| | | | |
|---|---|---|---|
| 4,204,848 A * | 5/1980 | Schulmeister | F02B 29/0406 123/563 |
| 4,705,066 A * | 11/1987 | Gut | G05D 16/18 137/486 |
| 5,871,001 A | 2/1999 | Pelkey | |
| 6,138,648 A | 10/2000 | Zentgraf | |
| 6,341,523 B2 * | 1/2002 | Lynam | 73/170.17 |
| 6,358,139 B1 * | 3/2002 | Renz | F24F 1/0007 454/187 |
| 7,011,079 B2 | 3/2006 | Park | |
| 2002/0104501 A1 | 8/2002 | Kawai | |
| 2004/0035392 A1 | 2/2004 | Ohsuga et al. | |
| 2004/0154586 A1 | 8/2004 | Ino et al. | |
| 2005/0139198 A1 | 6/2005 | Park | |
| 2006/0272621 A1 * | 12/2006 | Acuna | F02B 29/0443 123/542 |
| 2009/0031986 A1 | 2/2009 | Kaneko | |
| 2009/0260906 A1 | 10/2009 | Hartland et al. | |
| 2011/0073277 A1 * | 3/2011 | Karl | F24F 13/30 165/67 |

FOREIGN PATENT DOCUMENTS

| | | | | |
|---|---|---|---|---|
| DE | 3505492 A1 * | 8/1986 | | F28F 9/0224 |
| DE | 4403219 A1 | 8/1995 | | |
| DE | 19604738 A1 | 9/1996 | | |
| DE | 102007030464 A1 | 1/2009 | | |
| FR | 2645209 A1 | 10/1990 | | |
| JP | 61038121 | 2/1986 | | |
| JP | 2000-110676 A | 4/2000 | | |

OTHER PUBLICATIONS

Chinese Office Action dated Mar. 30, 2016 for Chinese Application No. 201380030597.8.
English abstract for DE-4403219.
English abstract for FR-2645209.
English abstract for DE-102007030464.
English abstract for JP-61038121.
English abstract for JP2000-110676.
English abstract for DE-19604738.
European Office Action dated Oct. 28, 2016 based on European Patent application No. 13 740 268.1.

* cited by examiner

FRESH AIR SUPPLY DEVICE

CROSS-REFERENCE TO RELATED APPLICATIONS

This application claims priority to German Patent Application No. 10 2012 213 164.7, filed Jul. 26, 2012, and International Patent Application No. PCT/EP2013/065425, filed Jul. 22, 2013, both of which are hereby incorporated by reference in their entirety.

TECHNICAL FIELD

The present invention relates to a fresh air supply device for an internal combustion engine, in particular of a motor vehicle, having the features of the introductory clause of claim 1.

BACKGROUND

A fresh air supply device which supplies a supercharged internal combustion engine with fresh air usually comprises a filter element, which is arranged in a filter compartment, and a charge-air cooler, which is arranged in a cooler compartment. For charging the fresh air, the internal combustion engine comprises, for example, a compressor or an exhaust gas turbocharger, which has a supercharger coupled with a fresh air system of the internal combustion engine and a turbine in drive-connection with the supercharger, which turbine is integrated into an exhaust gas system of the internal combustion engine.

From DE 196 04 738 A1 a fresh air supply device is known, which contains in a shared housing the filter compartment for receiving the filter element and the cooler compartment for receiving the charge-air cooler. Here, the housing is constructed so that an air stream supplied to the housing is divided in the housing into two partial streams. The one partial stream flows through the filter element, whilst the other partial stream flows through the charge-air cooler for cooling the charge air. For this, the one partial stream, after it has flowed through the filter element, is directed out from the housing and is supplied to a supercharger of an exhaust gas turbocharger. From the supercharger, the supercharged fresh air, i.e. the charge air, arrives back into the housing and flows through the charge-air cooler, from which then the cooled charge air is directed on to combustion chambers of the internal combustion engine. The efficiency of such a fresh air supply device is comparatively low with regard to the cooling capacity which is able to be achieved, if a compact type of construction is aimed for.

From DE 27 38 293 A1 a further fresh air supply device for a supercharged internal combustion engine is known, in which in a shared housing the filter element and, downstream therefrom, the charge-air cooler are arranged in a shared interior of the housing. The air purification in this fresh air supply device therefore takes place after the supercharging.

SUMMARY

The present invention deals with the problem of indicating for such a fresh air supply device an improved embodiment which is distinguished in particular by being able to be produced economically. Furthermore, a compact structural form and a high efficiency are to be realized.

This problem is solved in the present invention in particular by the subject of the independent claim. Advantageous embodiments are the subject of the dependent claims.

The present invention is based on the general idea, for accommodating the charge-air cooler and the filter element, of providing a one-piece housing which has the filter compartment and the cooler compartment integrally. In other words, the filter compartment and the cooler compartment are formed integrally as separate compartments at the same housing. Through such a one-piece housing, a particularly simple structure and a capability for the fresh air supply device to be manufactured particularly economically are the result.

Furthermore, the invention proposes equipping the charge-air cooler with a coolant inlet, with a coolant outlet and with an internal coolant path connecting the coolant inlet with the coolant outlet, which coolant path is coupled in a heat-transferring manner with a charge-air path running in the housing and directed through the cooler compartment. Through the integrated or respectively internal coolant path, the charge-air cooler can be operated in particular with a liquid coolant, whereby a particularly intensive charge-air cooling is able to be realized with a small installation space. Such a charge-air cooler of compact construction can be accommodated in a particularly simple manner in the proposed shared, one-piece housing, which considerably simplifies the manufacture of the housing as a one-piece component.

According to a preferred embodiment, the charge-air cooler can be constructed as a component which is able to be inserted, in particular able to be pushed into the cooler compartment. This permits a simple installation of the charge-air cooler in the housing; for maintenance or repair purposes, the charge-air cooler can be removed accordingly simply again from the housing of the fresh air supply device.

According to an advantageous further development, the charge-air cooler can have a cover body which has the coolant inlet and the coolant outlet and which closes a cooler compartment opening provided on the housing, through which the charge-air cooler is inserted into the cooler compartment. Hereby, a component of the charge-air cooler, namely the cover body, is given a multiple functionality. On the one hand, it forms a structural component of the charge-air cooler, which has a certain carrying function. On the other hand, the cover body forms a cover or closure for the cooler compartment opening of the housing. At the same time, the connecting of the charge-air cooler to a cooling circuit is thereby considerably simplified, because the coolant inlet and the coolant outlet are formed on this cover body, so that no separate aperture through a housing wall has to be provided and sealed.

According to an advantageous embodiment, the housing has a fresh air inlet for unfiltered and non-compressed fresh air, through which air can enter into the housing from the environment. Furthermore, the housing is expediently equipped with a charge-air outlet, through which filtered, supercharged and cooled charge air can emerge from the housing can be supplied to combustion chambers of the internal combustion engine.

According to another advantageous embodiment, a throttle device can be provided, the throttle member of which is arranged in a throttle compartment, which is formed integrally in or respectively on the housing. Hereby, the functional density of the housing is increased, which reduces the production costs.

According to an advantageous further development, the throttle device can be a unit which is able to be preassembled, which is added on to the housing so that the throttle member is inserted into the throttle compartment. This type of construction simplifies the assembly of the fresh air supply device, because only the preassembled throttle device has to be inserted or respectively added.

According to another further development, the throttle device can have a closure section, which closes a throttle compartment opening provided on the housing, through which the throttle member is inserted into the throttle compartment. Therefore, the functional density of the throttle device is increased. At the same time, the assembly of the fresh air supply device is simplified, because through the adding on of the throttle device, at the same time the throttle compartment opening, which is present for the introduction of the throttle member, can be closed.

An embodiment is particularly advantageous here in which the closure section of the throttle device can be connected by a clip connection with the housing. Hereby, additional separate fastening elements are dispensed with.

In another advantageous embodiment, an air mass sensor can be provided, the sensor system of which is arranged in a sensor compartment, which is formed integrally in or respectively on the housing. Through this measure, the functional density of the housing is increased, which reduces the manufacturing costs as a whole. The sensor compartment opens expediently into a clean side of the filter compartment: is therefore arranged downstream of the filter element in the fresh air path.

According to an advantageous further development, the air mass sensor can be a unit which is able to be preassembled, which is added onto the housing so that the sensor system is inserted into the sensor compartment. Here, also, by means of a unit which is able to be preassembled, the assembly of the air supply device is simplified and therefore configured in a more economical manner. In addition, the air mass sensor can fulfil a flow-directing function, e.g. can bring about a flow deflection. For this, a corresponding guide contour or respectively deflection contour can be provided in the air mass sensor, in order to realize this guidance or respectively deflection of the flow with as little flow resistance as possible. Such a contour cannot be realized, or can only be realized with considerably increased effort, in the housing itself, so that the shifting of this guidance- or respectively deflection function into the sensor leads to a simplification.

According to another advantageous further development, the air mass sensor can have a closure section, which closes a sensor compartment opening provided on the housing, through which the sensor system is inserted into the sensor compartment. Here, also, the functional density of the air mass sensor is increased, such that at the same time the installation effort is reduced, because with the mounting of the air mass sensor on the housing at the same time the sensor compartment opening, which is present for the insertion of the sensor system, can be closed.

In another advantageous further development, provision can be made that the closure section is connected by a clip connection with the housing. Through the elimination of separate fastening elements, the assembly is simplified.

For the supercharging of the fresh air, the internal combustion engine can be equipped with an exhaust gas turbocharger, the supercharger of which is incorporated into a fresh air system of the internal combustion engine, and the turbine of which is incorporated into an exhaust gas system of the internal combustion engine. The fresh air supply device which is presented here forms at least a component part of this fresh air system. In particular, the fresh air system of the internal combustion engine is formed by the fresh air supply device which is presented here. Accordingly, the supercharger of the exhaust gas turbocharger can also form a component part of the fresh air supply device. As the supercharger is integrated into the exhaust gas turbocharger, the exhaust gas turbocharger with its turbine can also form a component part of the fresh air supply device. Expediently, the fresh air path is directed within the fresh air supply device so that filtered fresh air is supplied to the supercharger, so that the supercharger is arranged in the fresh air path between the filter element and the charge air cooler.

According to an advantageous embodiment, an inlet connection piece can be formed integrally on the housing, to which the supercharger is connected or able to be connected on the outlet side. Additionally or alternatively, an outlet connection piece can be formed integrally on the housing, which is connected or able to be connected to the supercharger on the inlet side. This outlet connection piece can open here on the inlet side directly into the previously mentioned sensor compartment, so that the fresh air flows, after the filter element, firstly through the sensor compartment and thereafter arrives at the supercharger.

As mentioned above, according to an advantageous embodiment the charge-air cooler can have a cover body which closes the cooler compartment opening. In a simple case, this cover body can be configured as a cover plate which can consist in particular of a solid material. In an alternative embodiment, the cover body can be configured as a distributor- and collection box. The cover body is then a hollow body or respectively a housing for the coolant guidance. In both cases, provision is made that the coolant inlet and the coolant outlet are arranged or respectively constructed on this cover body.

According to an advantageous embodiment, the charge-air cooler can have a plurality of plates which are stacked on one another in a stacking direction and which are spaced apart from one another in the stacking direction, wherein intermediate spaces are produced between adjacent plates in the stacking direction, which form a part of the charge air path. In other words, through the structure of the charge-air cooler which is proposed here, the charge-air path can be directed through the charge-air cooler through the intermediate spaces of the plates. As these plates are coupled with the coolant path in a heat-transferring manner, a contacting with the charge air over a large area can be realized via the plates, which enables as large a heat transmission as possible.

According to an advantageous further development, the charge-air cooler can have several U-shaped tubes, the rectilinear sections of which are inserted through apertures of the plates, which are aligned to one another in the stacking direction, whilst curved sections of the tubes, which connect in each case two rectilinear sections with one another, run outside the stack. Hereby, a structure is produced for the charge-air cooler which is able to be realized in a particularly simple manner. In particular, only one stack of the said plates must be produced, into the apertures of which, which are aligned to one another, the U-tubes are inserted. The open ends of the U-tubes can communicate with a distributor chamber of the cover body or respectively with a collection chamber of the cover body.

In an advantageous further development, the plates can be arranged loosely with respect to the tubes. In particular, hereby a soldering of the tubes with the plates is dispensed with, whereby the production of the charge-air cooler is able to be realized particularly economically. Expediently, a push fit is formed between the plates and the tubes in the respective apertures, which can have in particular a small play or even a press fit.

In another advantageous further development, the straight sections of the tubes can be inserted through openings of a holding plate which adjoins the stack in the stacking direction and which is coated with an elastomer. In the mounted state, this holding plate can form the cover body or at least a component part of the cover body, which in the installed state closes the cooler compartment opening.

In another advantageous further development, provision can now be made to provide the holding plate with a housing seal which seals a section of the cover body of the charge-air cooler, configured as distributor- and collection box, with respect to the housing, wherein the cover body or respectively the said section has the coolant inlet and the coolant outlet. In particular, the coolant inlet communicates with a distributor compartment of the distributor- and collection box, whilst the coolant outlet communicates with a collection compartment of the distributor- and collection box. In particular, the holding plate closes the distributor- and collection box in the region of the cooler compartment opening of the housing. The housing seal is preferably produced from a plastic. It can be formed in particular by an integral component part of the elastomer coating of the holding plate.

According to an advantageous further development, the holding plate can have a tube seal for each of its openings, which seals the respective inserted section of the respective tube with respect to the holding plate. Hereby, a sufficiently tight guidance for the coolant can be realized within the charge-air cooler, also for the case where no soldered connection is provided between the holding plate and the tubes. The tube seals are preferably produced from a suitable plastic. They can be formed in particular by integral components of the elastomer coating of the holding plate.

According to another embodiment, provision can be made that the sections of the tubes are subsequently widened mechanically exclusively in the region of the holding plates. By means of such a mechanical widening, the tubes can be fixed to the holding plate. At the same time, a radial gap between the tubes and the holding plate within the respective opening can be reduced or respectively eliminated. In so far as in addition a tube seal is provided, through the subsequent widening a prestressed radial abutment, in particular a radial pressing between the respective tube and the associated tube seal can be realized.

In another advantageous embodiment, the housing can have a separate receiving pocket for each curved section, into which the respective curved section projects. Through this structural form, a positioning or respectively fixing in position is produced for the charge-air cooler in the housing on a side lying opposite the cooler compartment opening. At the same time, a guiding effect is produced for the assembly, whereby the insertion of the charge-air cooler into the housing is facilitated.

According to another advantageous embodiment, the cover body of the charge-air cooler can have a clipped connection with the housing. Through this measure, separate fastening elements are dispensed with, which simplifies the assembly.

In another embodiment, provision can be made that the filter element has at least one positioning element which cooperates with a positioning contour arranged on the housing in the filter compartment for the positioning and/or holding of the filter element in a predetermined relative position to the housing. Hereby, an incorrect assembly can be prevented. In particular, in the case of annular filter elements, the filter body of which consists of a folded web-shaped filter material, an increased reliability for the air mass measurement can be achieved by a connecting region of the filter body, in which end folds of the folded filter material are fastened to one another, are always arranged in the same relative position with respect to the respective positioning element, whereby downstream of the filter element always the same flow conditions occur. As an air mass sensor is usually arranged downstream of the filter element and preferably proximally thereto, likewise no change to the flow conditions occur there, so that the measurements of the air mass sensor also have substantially a consistent performance or respectively quality in the case of a changeover of filter element. In particular, through this measure, a readjustment of the air mass sensor can be dispensed with, which would be necessary per se in the case of a changeover of filter element if the air mass sensor is to continue to provide reliable measured values.

According to a preferred further development, the filter element can therefore have an annular filter body and two end plates which are arranged on axial front faces of the filter body, wherein the respective positioning element is arranged on such an end plate. In particular, such a positioning element can be provided on each end plate. Through the arrangement on the end plate, the production can be realized particularly economically. In particular, the positioning elements can be formed integrally on the end plates.

Further important features and advantages of the invention will emerge from the subclaims, from the drawings and from the associated figure description with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically,

FIG. 1 a schematic diagram of an internal combustion engine, in the manner of a circuit diagram, FIG. 2 an isometric view of an internal combustion engine with fresh air system and exhaust gas system, FIG. 3 an exploded illustration of a fresh air supply device, FIG. 4 an exploded illustration of a charge-air cooler, FIG. 5 a longitudinal section of the charge-air cooler, FIG. 6 an enlarged detail view VI of FIG. 5, FIG. 7 an enlarged detail view VII of FIG. 5, FIG. 8-11 side views of the charge-air cooler in different embodiments, FIG. 12 an enlarged view of a detail XII in FIG. 5 in installed state, FIG. 13 an isometric view of the fresh air supply device in the region of a mounted air mass sensor, FIG. 14 an isometric view of the air mass sensor, FIG. 15 an isometric view of the fresh air supply device in the region of the charge-air cooler with cut-open housing and truncated charge-air cooler, FIG. 16 an exploded, isometric view of the fresh air supply device in the region of a throttle device, FIG. 17 a view as in FIG. 16 with mounted throttle device.

DETAILED DESCRIPTION

Figure 1:
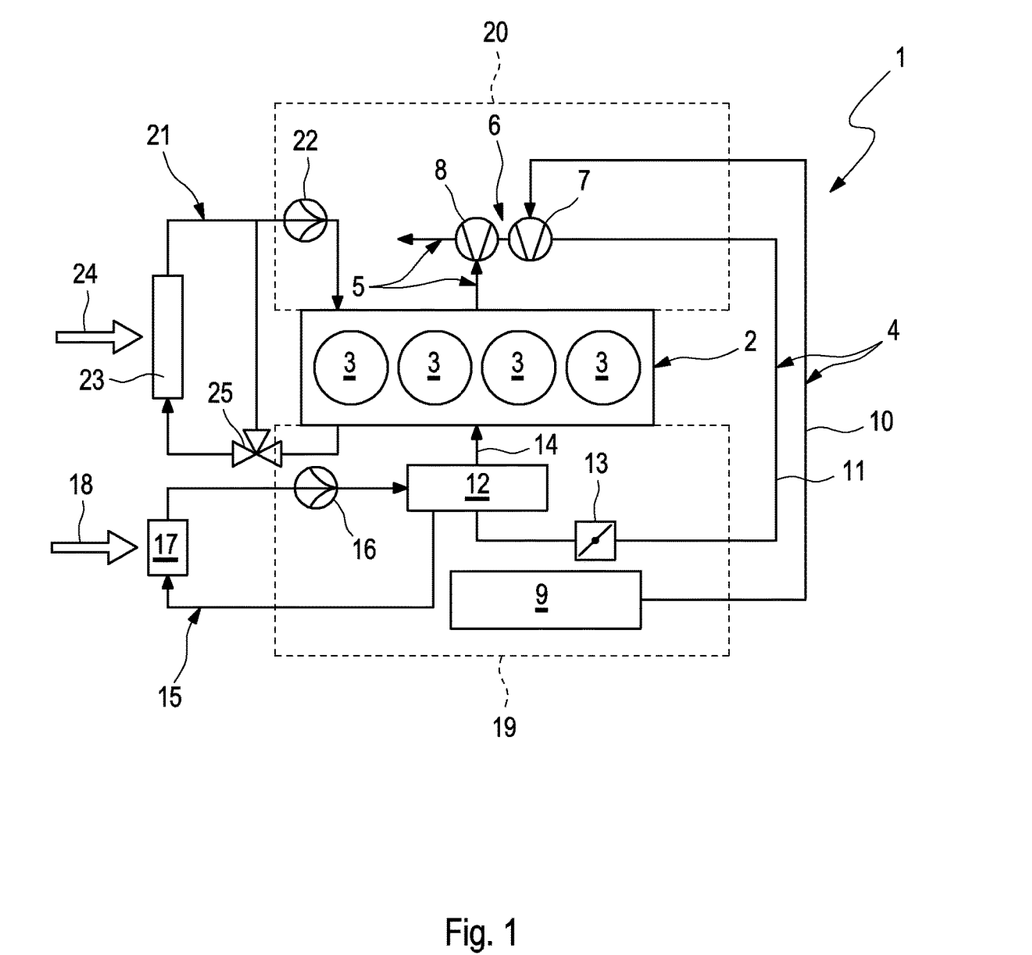

According to FIG. 1, an internal combustion engine 1, which is preferably used in a motor vehicle, comprises an engine block 2, which contains combustion chambers 3 in cylinders which are not designated in further detail. The internal combustion engine comprises a fresh air system 4 for the supply of the combustion chambers 3 with fresh air. In addition, the internal combustion engine 1 is equipped with an exhaust gas system 5 for discharging exhaust gas from the combustion chambers 3. The internal combustion engine 1 is supercharged and for this has an exhaust gas turbocharger 6, which has in a conventional manner a supercharger 7 and a turbine 8. The supercharger 7 is integrated into the fresh air system 4. The turbine 8 drives the supercharger 7 and is integrated into the exhaust gas system 5.

The fresh air system 4 comprises an air filter device 9, which is connected via a first connection 10 with an inlet of the supercharger 7, so that filtered fresh air with environmental temperature arrives at the supercharger 7. A second connection 11 connects an outlet side of the supercharger 7 with a charge-air cooler 12, whereby hot charge air arrives at the charge-air cooler 12. In the second connection 11 a throttle device 13 can be arranged. A third connection 14 connects the charge-air cooler 12 with the engine block 2, so that cooled charge air arrives at the combustion chambers 3.

The charge-air cooler 12 is integrated into a charge-air cooling circuit 15, which has a coolant pump 16 and a cooler 17, which is able to be acted upon by an air stream 18. In a vehicle application, this air stream 18 can be generated or respectively intensified by the headwind or by a fan which is not shown here. In FIG. 1, a rectangular frame 19 indicates a cold side of the internal combustion engine 1 with respect to the gas supply. A rectangular frame 20 indicates a hot side of the internal combustion engine 1 with respect to the gas elimination. Whilst in particular the air filter device 9, the throttle device 13 and the charge-air cooler 12 are situated on the cold side 19, in particular the supercharger 7, the turbine 8 and preferably the entire exhaust gas system 5 are arranged on the hot side 20.

For cooling the engine block 2 in addition an engine cooling circuit 21 is provided, which contains a coolant pump 22 and a cooler 23. This cooler 23 can also be acted upon by an air stream 24, which can be formed by the headwind and intensified by a fan, which is not shown. A thermostatic valve 25 enables a switchover between a warm-up operation bypassing the cooler 23 and a cooling operation integrating the cooler 23. As can be seen, the two cooling circuits 15, 21 are configured separately. They can be combined with one another insofar that for example the two coolers 17, 23 are arranged directly one behind the other, in order to be able to act upon them with a shared air stream 18 or respectively 24, whereby in particular only one shared fan is to be provided. Through the separation of the two cooling circuits 15, 21 it is possible in particular to operate the two cooling circuits 15, 21 at different temperature levels. In particular, the charge-air cooling circuit 15 is operated at a lower temperature level than the engine cooling circuit 21.

Figure 2:
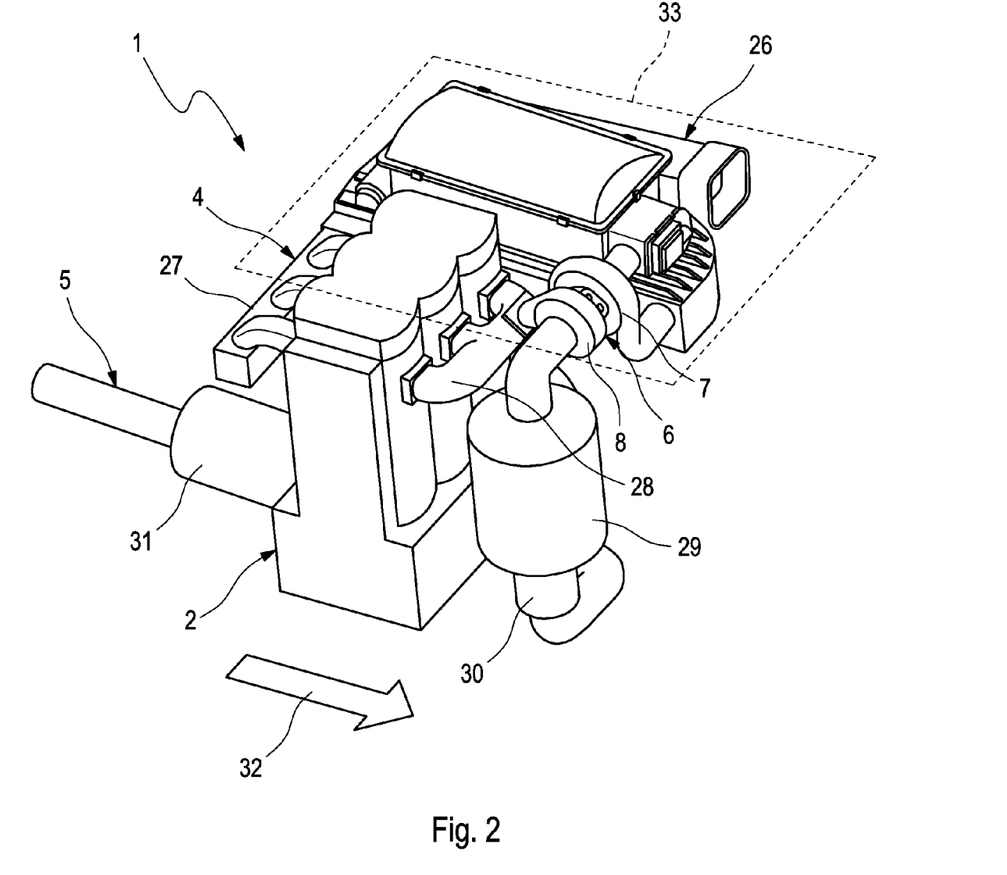

According to FIG. 2, the fresh air system 4 comprises an air supply device 26, to which in particular the exhaust gas turbocharger 6 and a charge-air distributor 27 can be added, which represents for example the third connection 14. The exhaust gas system 5 comprises an exhaust gas collector 28, which leads to the turbine 8. Downstream of the exhaust gas turbocharger 6, the exhaust gas system 5 can contain for example an oxidation catalyst 29, a particle filter 30 and a sound absorber 31. The coolant pump 16 of the charge-air cooling circuit 15 can also be added on to the air supply device 26 and can then be included in the scope of the air supply device 26.

In FIG. 2 the engine block 2 has, purely by way of example, only three cylinders, whilst in FIG. 1 four cylinders are provided. In FIG. 2, an arrow 32 indicates a direction of travel of the vehicle, whereby a preferred installation position for the internal combustion engine 1 is to be indicated. In addition, in FIG. 2 a rectangular frame 33 indicates the assembly group of the fresh air supply device 26, which is explained in further detail below. As can be seen, the air supply device 26 is configured so that very short paths are realized between the cold side and the warm side of the internal combustion engine 1, so that additional ducts and hoses can be dispensed with. The arrangement of the charge-air cooler 12 takes place in the housing 34 preferably so that the hot charge air can already be cooled very early, i.e. after a very short flow path. Hereby, the hot side of the fresh air path becomes comparatively short, which reduces the thermal stress of the fresh air supply device 26 and in particular the thermal stress of subsequent structural parts and components, such as e.g. the throttle device 46, in the air flow direction.

Figure 3:
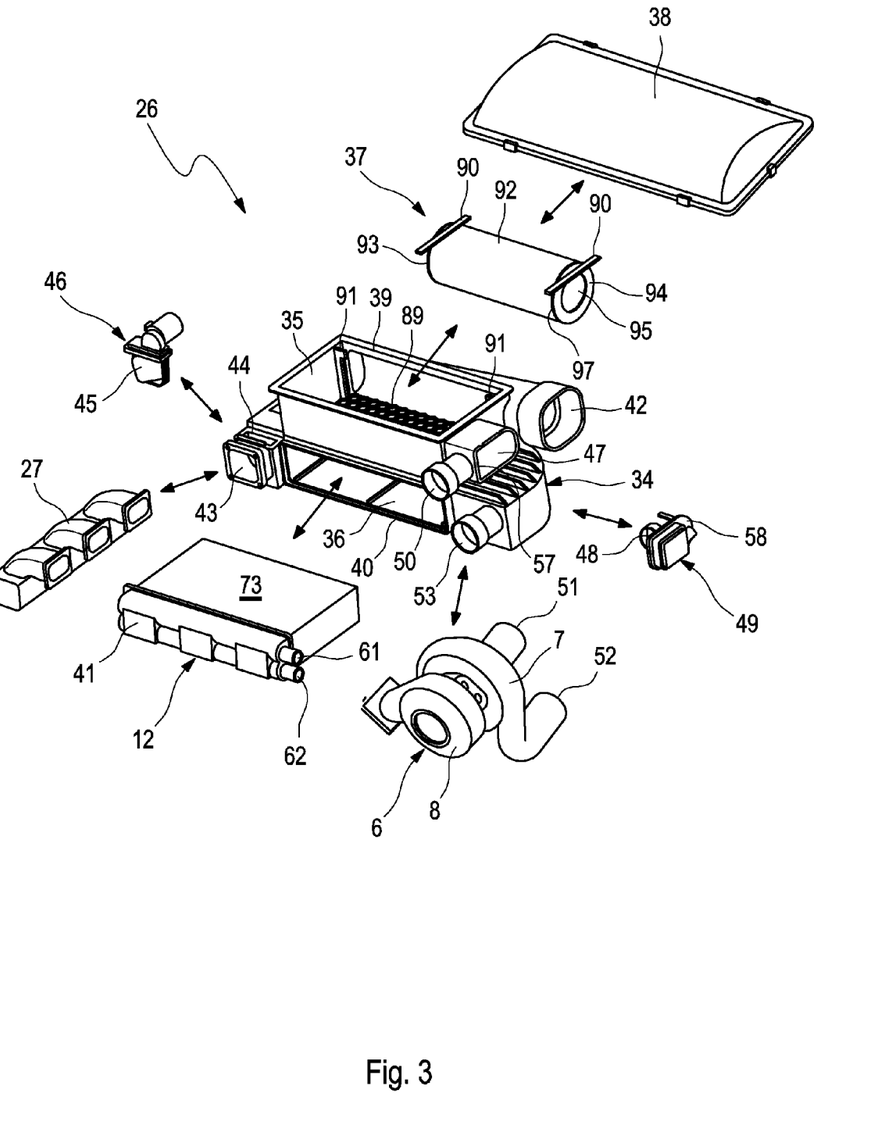

In accordance with FIG. 3, the fresh air supply device 26 has a one-piece housing 34, which contains integrally a filter compartment 35 and a cooler compartment 36, which are separated from one another by a base 89. The base 89 is likewise an integral component of the housing 34. It can be reinforced by webs. The fresh air supply device 26 comprises in addition a filter element 37, which is able to be inserted into the filter compartment 35. Furthermore, a cover 38 is provided, which can close a filter compartment opening 39 of the housing 34. Through this filter compartment opening 39 the filter element 37 is able to be inserted into the filter compartment 35. By closing the filter compartment opening 39 with the cover 38, the air filter device 9 introduced in FIG. 1 is realized, and namely as an integral component of the fresh air supply device 26. In particular, the cover 38 can have a clipped connection with the housing 34, so that separate fastening elements can be dispensed with. Through the clipped connection, the cover 38 is fastened on the housing 34 so as to be able to be detached at any time.

In the preferred embodiment shown in FIG. 3, the filter element 37 is configured as a ring filter element, so that it has an annular filter body 92 and two end plates 93, 94. The filter body 92 surrounds an interior space and consists preferably of a pleated or respectively folded web-shaped filter material. The end plates 93, 94 are arranged on axial front faces of the filter body 92. In the example, the end plate 93 arranged on the left in FIG. 3 is configured as a closed end plate 93, whereas the end plate 94 arranged on the right is configured as an open end plate 94. The open end plate 94 contains a central opening 95, through which a fluid connection with an interior of the filter element 37, surrounded by the filter body 92, is possible. On the open end plate 94 in addition an axially protruding radial seal 97 is formed, which surrounds the opening 95 and in the installed state lies in a radially sealing manner against a connection piece of the housing 34 projecting into the opening 95. Basically, an embodiment with two open end plates 93, 94 is also conceivable. The filter element 37 is configured in addition with at least one positioning element 90. In the example, two positioning elements 90 are provided. In each case a positioning element 90 is arranged in each case on one of the end plates 93, 94. Preferably, the respective positioning element 90 is formed integrally on the respective end plate 93, 94. The positioning elements 90 cooperate with positioning contours 91 complementary thereto on insertion of the filter element 37 into the filter compartment 35, in order to position the filter element 37 relative to the housing 34 in a predetermined relative position. In the installed state, the positioning elements 90 can cooperate in addition for holding or respectively fixing this relative position between filter element 37 and housing 34. In the example, the respective positioning element 90 is configured as a rectilinear bar which extends transversely and eccentrically to the longitudinal centre axis of the filter element 37 and projects on both sides over the associated end plate 93, 94.

In other embodiments, instead of the preferred annular filter element 37 any other desired filter element 37 can also be used, which has for example e.g. a plate-shaped or horseshoe-shaped filter body.

The air supply device 26 comprises in addition the charge-air cooler 12, which is able to be inserted through a cooler compartment opening 40 into the cooler compartment 36. For this, the charge-air cooler 12 can be inserted into the cooler compartment 36 through the cooler compartment opening 40. Expediently, the charge-air cooler 12 has a cover body 41, which closes the cooler compartment opening 40 in the installed state.

In addition, the housing 34 has integrally a fresh air inlet 42 for unfiltered fresh air and a charge-air outlet 43 for cooled charge air. The charge-air distributor 27 is able to be connected to the charge-air outlet 43.

The housing 34 contains in addition a throttle compartment 44, into which a throttle member 45 of a throttle device 46 is able to be inserted. The throttle compartment 44 is formed here integrally on the housing 34. The throttle compartment 44 is situated in addition with respect to a fresh air path, which leads through the housing 34, between the charge-air cooler 12 and the charge-air outlet 43.

The housing 34 contains in addition a sensor compartment 47, into which a sensor system 48 of an air mass sensor 49 is able to be inserted. The sensor compartment 47 is also formed integrally on the housing 34. It is situated in the fresh air path between the filter compartment 35 and an outlet connection piece 50, which is likewise formed integrally on the housing 34. An inlet 51 of the supercharger 7 is able to be connected to this outlet connection piece 50. On the other hand, an outlet 52 of the supercharger 7 is able to be connected to an inlet connection piece 53, which is formed integrally on the housing 34. The inlet connection piece 53 is arranged here with respect to the fresh air path upstream of the charge-air cooler 12 or respectively upstream of the cooling compartment 36.

In order to be able to produce the housing 34 in a particularly simple manner as a one-piece injection moulded part, several housing openings are oriented parallel to one another. For example, the cooler compartment openings 40, the charge-air outlet 43, the outlet connection piece 50 and the inlet connection piece 53 are oriented parallel to one another. In addition, the fresh air inlet 42 and a sensor compartment opening 57 are oriented parallel to one another here. The three groups which are provided here, which contain respectively housing openings parallel to one another, are aligned to one another in the example in three spatial directions oriented perpendicularly to one another.

Figure 16:
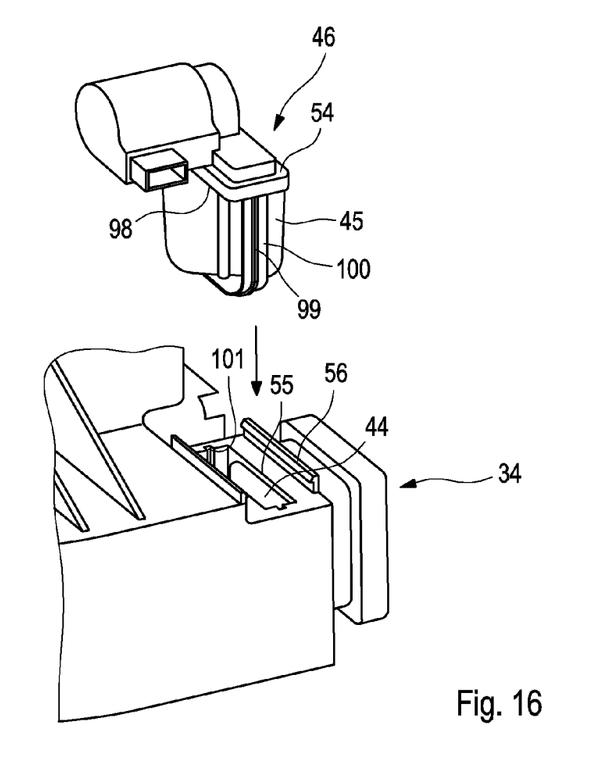
Figure 17:
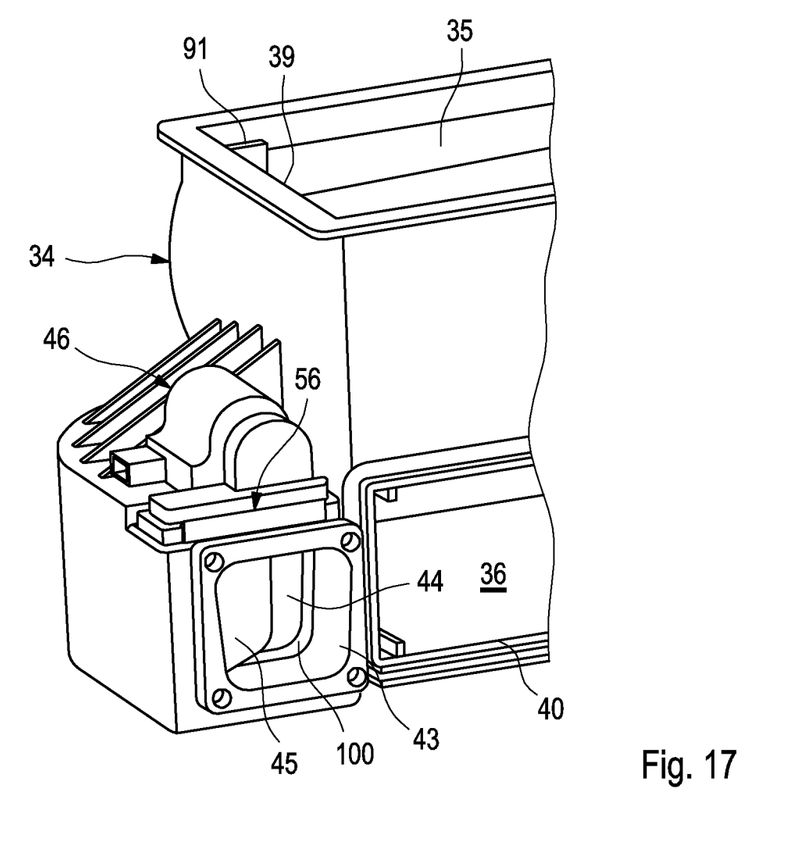

As can be seen from FIGS. 3, 16 and 17, the throttle device 46 can expediently be a unit which is able to be preassembled, which can be added onto the housing 34 so that in so doing the throttle member 45 is inserted into the throttle compartment 44. Expediently, the throttle device 46 has a closure section 54. For the insertion of the throttle member 45, the housing 34 has a throttle compartment opening 55, through which the throttle member 45 is able to be inserted into the throttle compartment 44. The closure section 54 closes this throttle compartment opening 55 in assembled state. Expediently, a clip connection 56 can be provided for securing the throttle device 46 to the housing 34. In the example, the clip connection 56 comprises detent elements on the housing side, which engage behind the closure section 54. On a side facing the throttle compartment opening 55 in accordance with FIG. 16 expediently an axial seal 98 can be arranged on the closure section 54, which in the installed state lies in a sealing manner along the opening edge of the throttle compartment opening 55 on the housing 34. In addition, a further seal 99 can be arranged on an outer side of the frame 100, which in the installed state engages into a guide groove 101 which is formed on an inner side of the housing 34 exposed to the throttle compartment 44. The frame 100 surrounds the throttle member 45, which is configured as a valve, in particular as a butterfly valve, in order to provide the sealing contour required for this on the throttle device 46 itself, whereby a highly efficient and relatively precisely modulable throttling is able to be realized.

Figure 13:
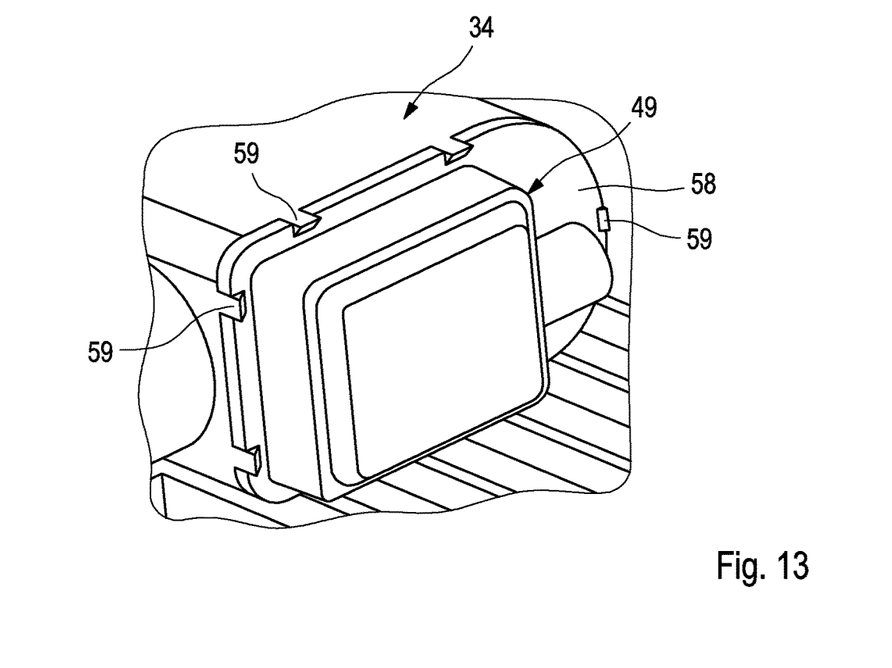
Figure 14:
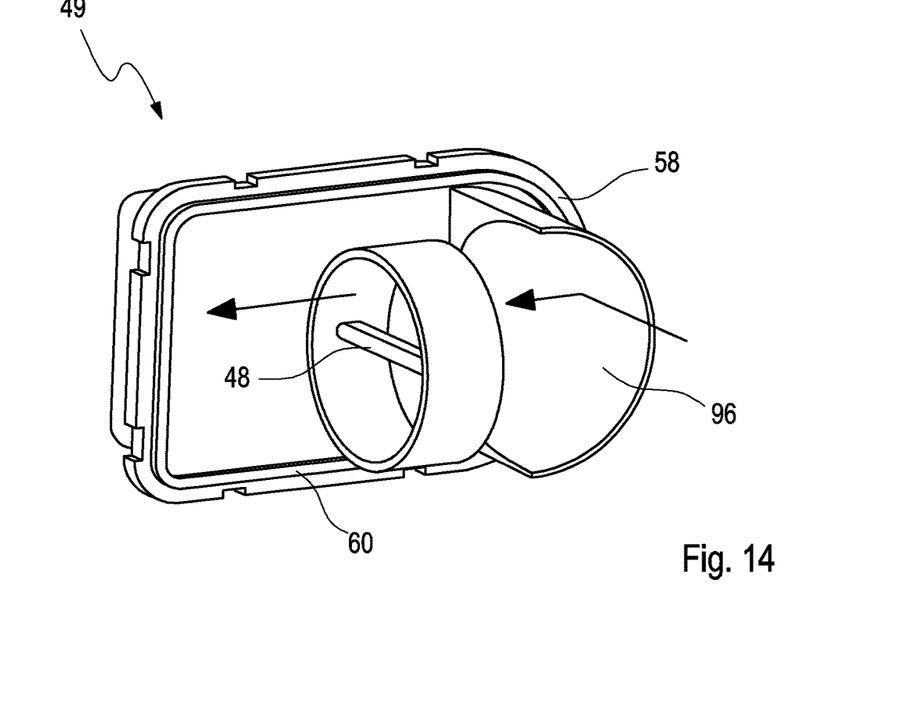

According to FIGS. 3, 13 and 14, the air mass sensor 49 preferably forms a unit which is able to be preassembled, which can be added onto the housing 34 so that in so doing the sensor system 48 is inserted into the sensor compartment 47. In order to be able to insert the sensor system 48 into the sensor compartment 47, a sensor compartment opening 57 is provided on the housing 34. The air mass sensor 49 has a closure section 58, which is shaped in a complementary manner to the sensor compartment opening 57, so that through the mounting of the air mass sensor 49 the sensor compartment opening 57 is automatically closed. Here, also, in accordance with FIG. 13 a clip connection 59 can be provided, in order to be able to fix the air mass sensor 49 on the housing 34 in a simple manner. In the example, the clip connection 59 comprises several detent arms on the housing side, which in the assembled state overlap the closure section 58.

According to FIG. 14, a seal 60 can be arranged on an inner side of the closure section 58 facing the housing 34, in order to simplify a gas-tight closing of the sensor compartment opening 57 by means of the closure element 58. A corresponding seal can also be arranged on the inner side of the closure section 54 of the throttle device 46 facing the housing 34. In FIG. 14 in addition a guide contour 96, formed on the air mass sensor 49, can also be seen, which on mounting of the air mass sensor 49 penetrates into the sensor compartment 47 and is positioned therein so that the desired flow deflection or respectively flow guidance is produced therein. In the example, by means of the guide contour 96 in the sensor compartment 47 a flow deflection about approximately 90° is achieved with comparatively little flow resistance.

A preferred embodiment of the charge-air cooler 12 with variants is explained in further detail by means of FIGS. 4-12 and 15.

The charge-air cooler 12 has a cover body 41, which in the assembled state tightly closes the cooler compartment opening 40. This cover body 41 has here a coolant inlet 61 and a coolant outlet 62. Therefore, the coolant inlet 61 and coolant outlet 62 are situated on an outer side of the housing 34. Coolant inlet 61 and coolant outlet 62 are connected with one another within the charge-air cooler 12 by a coolant path. The charge-air cooler 12 is able to be integrated into the charge-air cooling circuit 15 via the connections 61, 62.

In an embodiment which is not shown, the cover body 41 can basically be configured as a simple cover plate which has no flow guidance function in its interior. However, the embodiment which is shown here is preferred, in which the cover body 41 has a distributor- and collection box 63 or is configured as such. According to FIGS. 5 and 8, this distributor- and collection box 63 can therefore have in particular a distributor chamber 64, which is fluidically connected with the coolant circuit 61, and a collection chamber 65, which is fluidically connected with the coolant outlet 62.

According to FIGS. 4-7, the charge-air cooler 12 comprises a plurality of plates 66, which are stacked on one another in a stacking direction 67. According to FIG. 7, an intermediate space 68 is formed respectively between individual plates 66, which are adjacent to one another in the stacking direction 67. These intermediate spaces 68 form a portion of the charge-air path which leads through the charge-air cooler 12 within the housing 34.

The charge-air cooler 12 has in addition several U-shaped tubes 69, which have respectively two rectilinear sections 70 and one curved section 71, wherein the respective curved section 71 connects the two associated rectilinear sections 70 fluidically with one another. In addition, the rectilinear sections 70 expediently extend parallel to one another, so that the curved section 71 forms a 180° arc. The rectilinear sections 70 are inserted through apertures 72, which are formed in the plates 66. In adjacent plates 66, these are arranged aligned to one another by breaks 72 in the stacking direction 67. The plates 66, stacked on one another, form a plate stack 73. Whilst the rectilinear sections 70 of the tubes 69 therefore run largely within the plate stack 73, the curved sections 71 extend outside the stack 73. According to FIGS. 6 and 7, the apertures 72 can have respectively a turn 74. A height of the turns 74 measured in the stacking direction 67 defines the distance, measured in the stacking direction 67, of adjacent plates 66. At the same time, the turns 74 simplify the assembly of the charge-air cooler 12.

Figure 4:
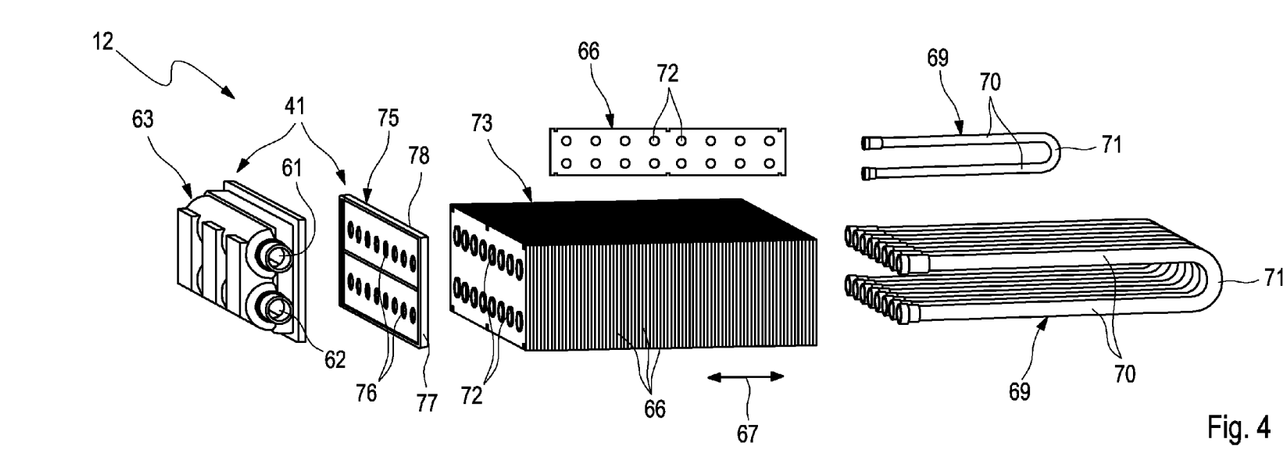
Figure 5:
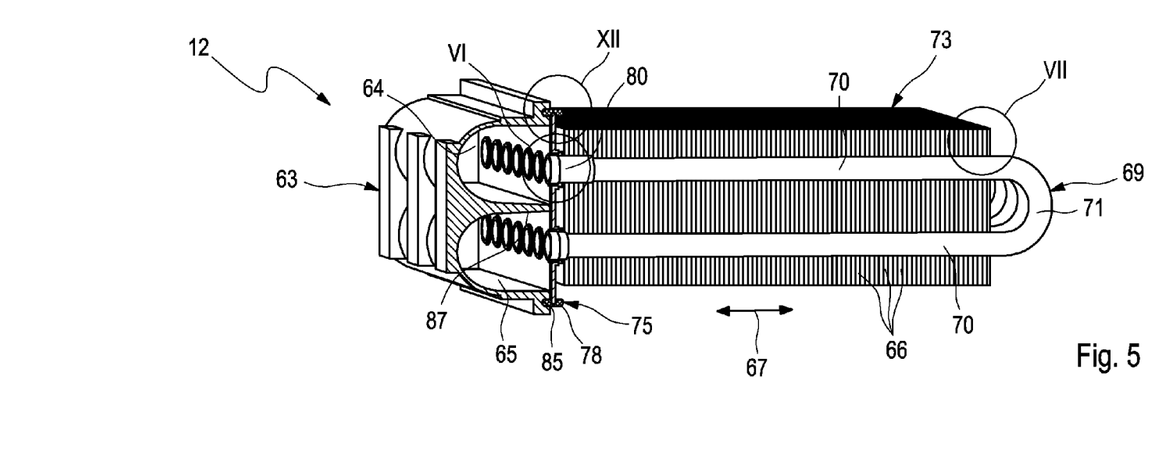

In FIG. 4, purely by way of example next to the plate stack 73 an individual plate 66 is illustrated, and next to the arrangement of the tubes 69 an individual tube 69 is illustrated.

An embodiment is particularly advantageous in which the plates 66 are arranged loosely with respect to the tubes 69, so that therefore in particular no soldered connections are present between the plates 66 and the tubes 69. For this purpose, the turns 74 can respectively define a push fit or press fit.

In the embodiments which are shown here, the cover body 41 has a holding plate 75, which closes the distributor- and collection body 63 towards the stack 73 and which contains a plurality of openings 76. The free ends or end sections 80 of the straight sections 70 of the tubes 69 are inserted through these openings 76. The holding plate 75 is expediently coated with an elastomer 77. This elastomer coating, which is likewise designated below by 77, is expediently realized so that it covers the holding plate 75 completely on a side facing the chambers 64, 65 of the distributor- and collection box 63. Furthermore, the elastomer coating 77 is additionally configured here so that it penetrates and engages behind the openings 76 according to FIG. 6. Finally, provision is made according to FIG. 12 that the elastomer coating 77 forms a circumferential housing seal 78 on the holding plate 75, which surrounds a circumferential outer edge 79 of the holding plate 75 in a closed manner in the circumferential direction and in so doing also overlaps the edge 79 on both sides. The side of the holding plate 75 facing the stack 73 is largely uncoated in the example.

Figure 6:
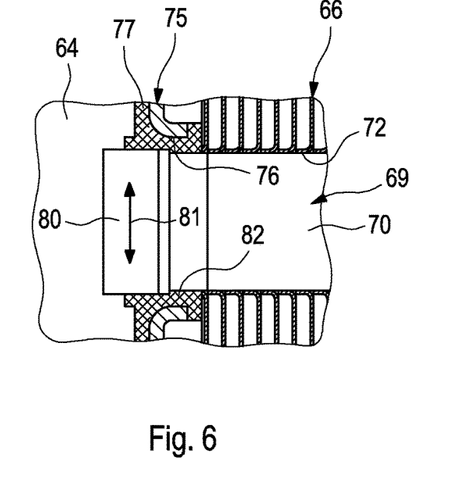
Figure 7:
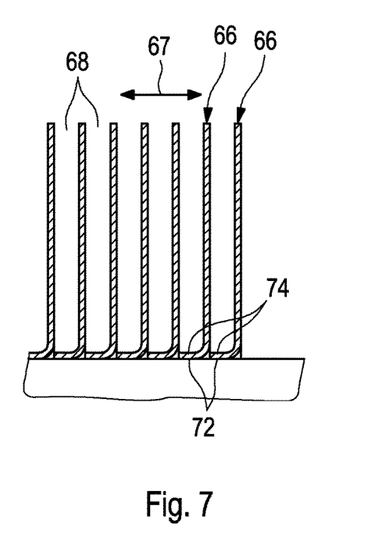

According to FIG. 6, the tubes 69 or respectively the rectilinear sections 70 thereof are in contact with the elastomer coating 77 in the openings 76, whereby a sufficient seal can be realized. In addition, to improve the seal and for fixing the holding plate 75 on the stack 73, provision can be made to mechanically widen with regard to their cross-section the ends 80 of the tubes 69 inserted into the holding plate 75, in accordance with a double arrow 81. Hereby, a fixing of the tubes 69 on the holding plate 75 can be realized, whereby the entire stack 73 is stabilized with respect to the holding plate 75. It is noteworthy here that no soldered connection is required for stabilizing the stack 73. At the same time, the pressing of the tube ends 80 in the openings 76 of the holding plate 75 improves the seal of the elastomer layer 77.

The elastomer layer 77 therefore forms on the holding plate 75 a tube seal 82 for each opening 76, which seals the respective inserted end section 80 of the respective tube 69 with respect to the holding plate 75. In addition, the elastomer layer 77 forms the housing seal 78, which in the assembled state seals the distributor- and collection box 64 or respectively the entire cover body 41 with respect to the housing 34. The housing seal 78 engages here axially respectively into a groove 84 on the housing side and a groove 85 on the box side. Furthermore, according to FIG. 5 the elastomer layer 77 in connection with a dividing wall 87 of the distributor- and collection box 63 seals the distributor compartment 64 of the distributor- and collection box 63 on the inlet side with respect to the collection compartment 65 of the distributor- and collection box 63 on the outlet side.

Figure 12:
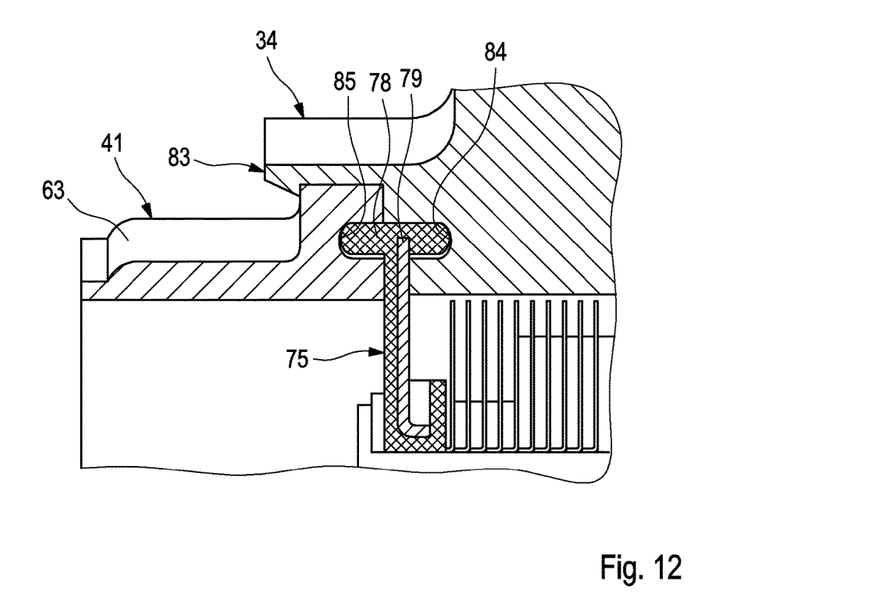

According to FIG. 12 the cover body 41 can be fastened to the housing 34 by means of a clip connection 83. In the example which is shown here, several clip elements are provided on the housing side, which engage behind a circumferential edge of the cover body 41, which is formed here on the distributor- and collection box 63.

Figure 15:
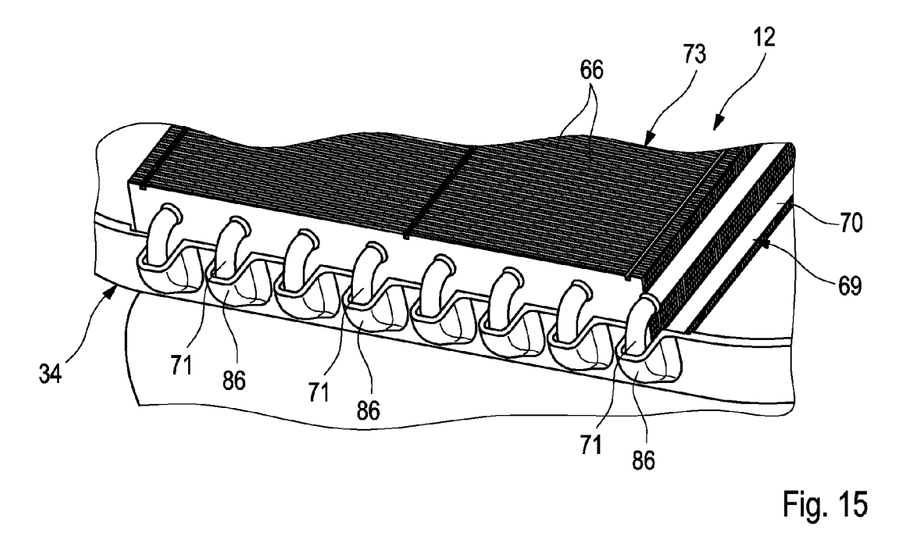

According to FIG. 15, the housing 34 can have respectively a separate receiving pocket 86 on a side lying opposite the cooler compartment opening 40 for each curved section 71, which receiving pocket is open to the interior of the housing 34 and into which the respective curved section 71 projects. Hereby, an efficient fixing in position in the housing 34 is produced for the charge-air cooler 12 via the tubes 69.

With reference to FIGS. 8-11, four variants for the charge-air cooler 12 are to be explained below in further detail, wherein principally the guiding of coolant in distributor- and collection box 63 is addressed.

Figure 8:
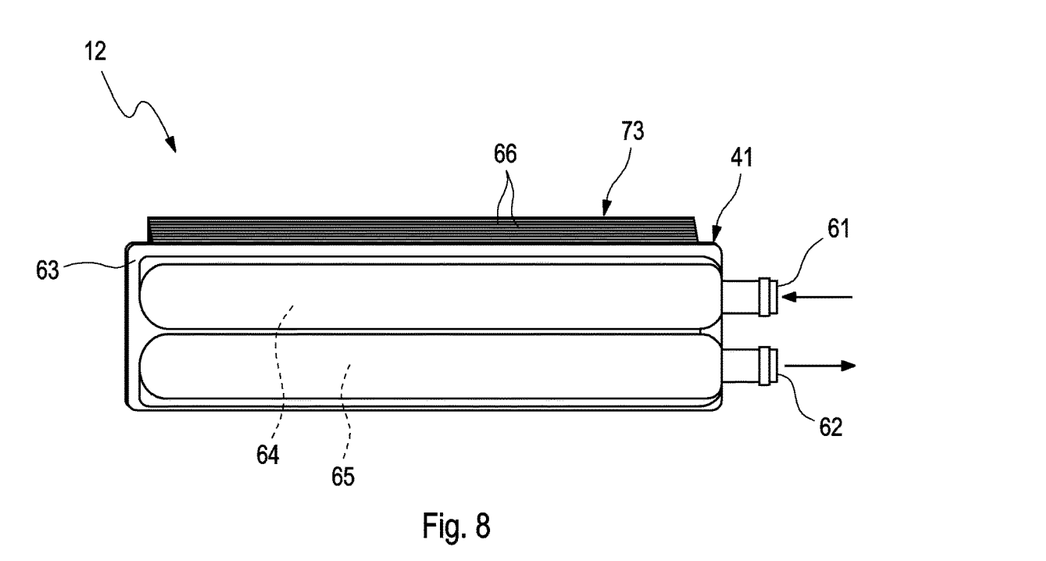

FIG. 8 shows the simple embodiment, presented here in further detail, in which a single distributor compartment 64 and a single collection compartment 65 are formed in the distributor- and collection box 63. These are separated from one another according to FIG. 5 by a dividing wall 87 formed integrally on the box 63, which dividing wall in the installed state comes to lie on the front face against the elastomer layer 77.

Figure 9:
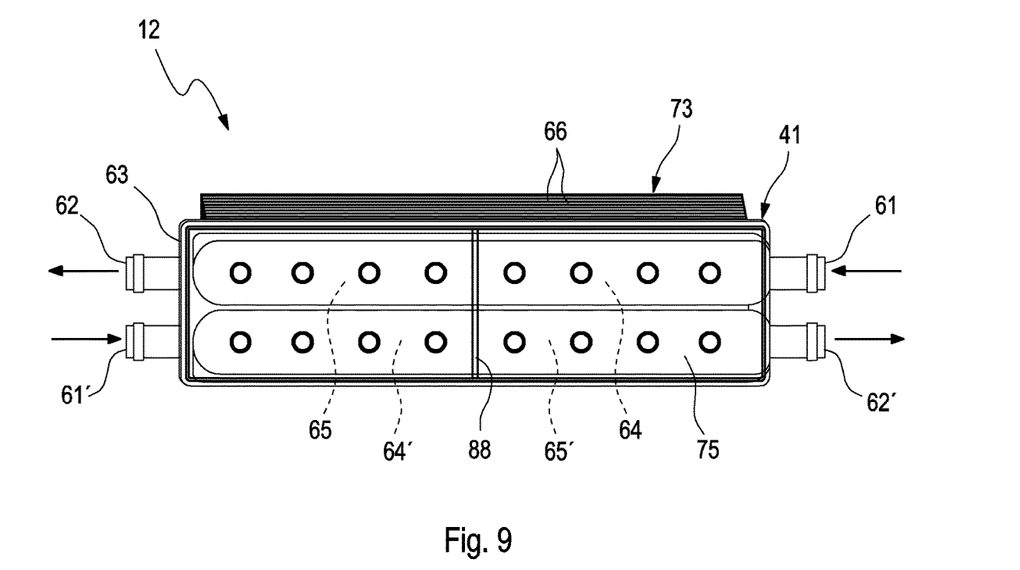
Figure 10:
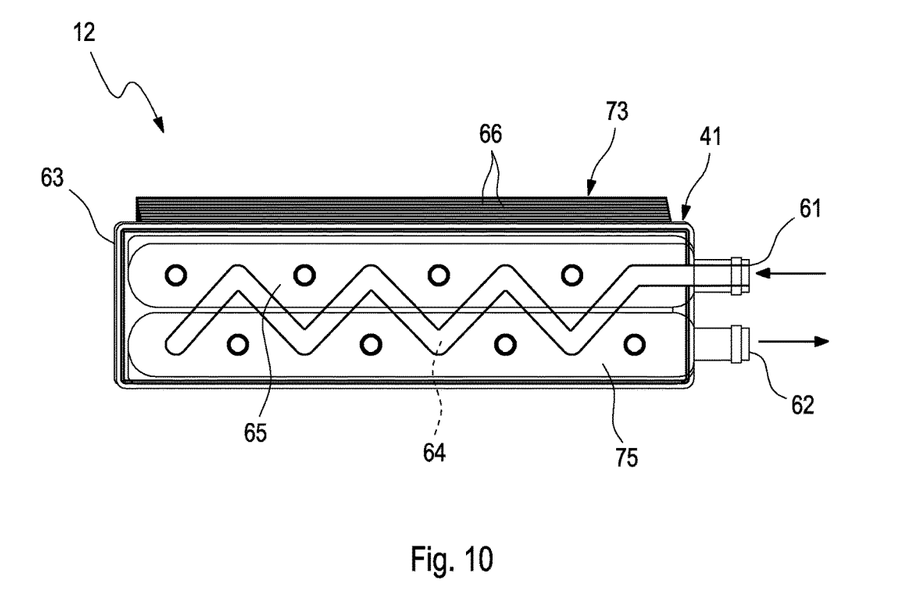
Figure 11:
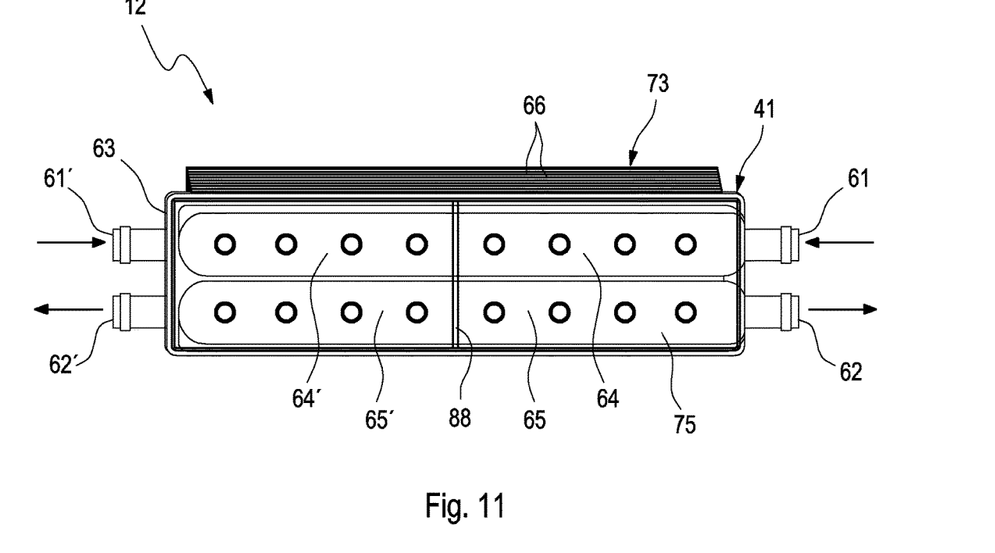

FIGS. 9-11 now show three different variants of the embodiment shown in FIG. 8, wherein for simplified understanding the distributor- and collection box 63 is illustrated so as to be transparent. FIG. 9 shows an embodiment in which a further dividing wall 88 is arranged in the box 63, whereby the two chambers 64, 65 of the embodiment shown in FIG. 8 are divided into a total of four chambers, so that consequently a first inlet chamber 64 and a second inlet chamber 64' are present, which are fluidically connected with two coolant inlets 61, 61'. Accordingly also two outlet chambers 65 or respectively 65' are provided, which are connected with two coolant outlets 62, 62'. Hereby, in particular a double-flow low temperature cooler can be realized.

In the embodiment shown in FIG. 10, the inlet chamber 64 is provided with a zigzag contour in the box 63, in order to connect different tubes 69 with one another via different sections. The inlet chamber 65 then connects the remaining tube sections with one another in a manner complementary thereto. Through this arrangement, a comparatively homogeneous temperature distribution can be realized within the charge-air cooler 12.

In the embodiment shown in FIG. 11, again four chambers are formed in the box 63, but connected differently to in FIG. 9, whereby it is possible to realize in the charge-air cooler 12 a low temperature circuit formed for example in the left-hand half and a high temperature circuit formed for example in the right-hand half.

The invention claimed is:

1. A fresh air supply device for an internal combustion engine, comprising:
   a filter element arranged in a filter compartment,
   a charge-air cooler arranged in a cooler compartment,
   a one-piece housing integrally including the filter compartment and the cooler compartment, wherein the charge-air cooler has a coolant inlet, a coolant outlet and an internal coolant path which connects the coolant inlet to the coolant outlet, the internal coolant path being coupled in a heat-transferring manner to a charge-air path extending inside the one-piece housing and through the cooler compartment,
   an outlet connection formed integrally on the one-piece housing and located downstream of the filter compartment and upstream of the cooler compartment, the outlet connection configured to connectedly receive a supercharger of an exhaust gas turbocharger on an inlet side, and
   an inlet connection formed integrally on the one-piece housing and located downstream of the filter compartment and upstream of the cooler compartment, the inlet connection configured to connectedly receive a supercharger of an exhaust gas turbocharger on an outlet side.

2. The device according to claim 1, wherein the charge-air cooler includes a cover body which has the coolant inlet and the coolant outlet, the cover body closing a cooler compartment opening provided on the one-piece housing, through which the charge-air cooler is inserted into the cooler compartment.

3. The device according to claim 2, wherein the cover body at least one of: (i) is configured as a distributor- and collection box, and (ii) includes a distributor- and collection box.

4. The device according to claim 1, further comprising a throttle device having a throttle member arranged in a throttle compartment formed integrally at least one of in and on the one-piece housing.

5. The device according to claim 4, wherein the throttle device is a preassembled unit, wherein the preassembled unit is added onto the one-piece housing so that the throttle member is inserted into the throttle compartment.

6. The device according to claim 4, wherein the one-piece housing includes a throttle compartment opening through which the throttle member is inserted, and the throttle device includes a closure such that the throttle compartment is closed when the throttle member is inserted into the throttle compartment.

7. The device according to claim 6, wherein the closure is connected via a clip connection with the one-piece housing.

8. The device according to claim 1, further comprising an air mass sensor in communication with a sensor system, the sensor system being arranged in a sensor compartment formed integrally at least one of in and on the one-piece housing.

9. The device according to claim 8, wherein the air mass sensor has a closure such that when the sensor system is inserted into the sensor compartment, an opening into the closure compartment is closed.

10. The device according to claim 9, wherein the closure is connected by a clip connection with the one-piece housing.

11. The device according to claim 1, wherein the charge-air cooler includes a plurality of plates stacked onto one another in a stacking direction to form a stack, the plurality of plates being spaced apart from one another in the stacking direction defining a plurality of intermediate spaces therebetween, wherein the plurality of intermediate spaces of adjacent plates define a portion of the charge-air path.

12. The device according to claim 11, wherein the charge-air cooler further includes a plurality of U-shaped tubes respectively defining at least two rectilinear sections and at least one curved section, wherein the at least two rectilinear sections are respectively inserted through corresponding apertures of the plates, the apertures being aligned to one another in the stacking direction, and wherein the at least one curved section of the respective U-shaped tubes, which connect in each case the at least two rectilinear sections with one another, run outside the stack of plates.

13. The device according to claim 12, further comprising a holding plate adjoining the stack of plates in the stacking direction, wherein the at least two rectilinear sections of the respective U-shaped tubes are inserted through corresponding openings of the holding plate to define an inserted section, the holding plate being coated with an elastomer.

14. The device according to claim 13, wherein the holding plate has a housing seal which seals a cover body of the charge-air cooler with respect to the one-piece housing, the cover body being configured as distributor- and collection box, wherein the cover body includes the coolant inlet and the coolant outlet.

15. The device according to claim 14, wherein the elastomer forms a housing seal that seals one of the distributor- and collection box or the entire cover body, and wherein the cover body includes a groove and the one-piece housing includes a corresponding groove, the housing seal engaging axially within the grooves.

16. The device according to claim 13, wherein the holding plate has a tube seal associated with each of the openings, the respective tube seals configured to seal the respective inserted sections of the at least two rectilinear sections with respect to the holding plate.

17. The device according to claim 13, wherein at least the inserted sections of the at least two rectilinear sections are subsequently widened mechanically in the region of the holding plate.

18. The device according to claim 13, wherein the one-piece housing includes a separate receiving pocket for each curved section of the tubes, the respective curved section projecting into the associated receiving pockets.

19. The device according to claim 1, wherein the filter element has at least one positioner, and the one-piece housing includes a positioning contour corresponding to the at least one positioner and arranged in the filter compartment, the at least one positioner and the corresponding positioning contour at least one of positions and holds the filter element in a predetermined position with respect to the one-piece housing.

* * * * *